(12) United States Patent
Hepburn et al.

(10) Patent No.: US 6,296,822 B1
(45) Date of Patent: Oct. 2, 2001

(54) PROCESS FOR MANUFACTURING NOX TRAPS WITH IMPROVED SULFUR TOLERANCE

(75) Inventors: Jeffrey Scott Hepburn, Birmingham; John Denari, Dearborn, both of MI (US); William Lewis Henderson Watkins, Toledo, OH (US)

(73) Assignee: Ford Global Technologies, Inc, Dearborn, MI (US)

( * ) Notice: Subject to any disclaimer, the term of this patent is extended or adjusted under 35 U.S.C. 154(b) by 0 days.

(21) Appl. No.: 09/537,649

(22) Filed: Mar. 29, 2000

(51) Int. Cl.$^7$ ............................ B01J 8/00; C01B 21/00
(52) U.S. Cl. ...................... 423/239.1; 423/213.5
(58) Field of Search ........................ 502/304, 325, 502/326, 327, 328, 330, 332, 334, 339, 340, 344, 355, 527.15; 423/213.5, 239.1

(56) References Cited

U.S. PATENT DOCUMENTS

| | | |
|---|---|---|
| 3,899,444 | 8/1975 | Stephens . |
| 4,438,219 | 3/1984 | Brandenburg et al. . |
| 4,691,071 * | 9/1987 | Bricker ................................. 585/319 |
| 4,827,072 * | 5/1989 | Imai et al. ........................... 585/443 |
| 4,843,056 | 6/1989 | Matsumoto et al. . |
| 4,973,779 * | 11/1990 | Imai et al. ........................... 585/444 |
| 5,012,027 * | 4/1991 | Abrevaya et al. ................... 585/443 |
| 5,179,059 * | 1/1993 | Domesle et al. ..................... 502/303 |
| 5,543,124 * | 8/1996 | Yokota et al. ..................... 423/239.1 |
| 5,575,983 | 11/1996 | Suzuki et al. . |
| 5,677,258 * | 10/1997 | Kurokawa et al. .................. 502/303 |
| 5,702,675 * | 12/1997 | Takeshima et al. ............... 423/213.5 |
| 5,727,385 * | 3/1998 | Hepburn ................................. 60/297 |
| 5,750,082 | 5/1998 | Hepburn et al. . |
| 5,758,489 * | 6/1998 | Hepburn et al. ........................ 60/274 |
| 5,762,892 * | 6/1998 | Kasahara et al. ................. 423/213.5 |
| 5,804,152 * | 9/1998 | Miyoshi et al. ................... 423/213.5 |
| 5,814,576 * | 9/1998 | Yamamoto ........................... 502/303 |
| 5,884,473 * | 3/1999 | Noda et al. ............................. 60/274 |
| 5,911,960 | 6/1999 | Miyoshi et al. . |
| 5,958,826 * | 5/2000 | Kurokawa et al. .................. 502/303 |
| 5,968,870 | 10/1999 | Iizuka et al. . |
| 5,972,830 * | 10/1999 | Yoshida et al. ...................... 502/304 |
| 6,010,673 | 1/2000 | Kanazawa et al. . |
| 6,066,587 * | 5/2000 | Kurokawa et al. .................... 502/66 |
| 6,159,897 * | 12/2000 | Suzuki et al. ........................ 502/351 |
| 6,187,981 * | 2/2001 | Marinangeli et al. ............... 585/323 |

FOREIGN PATENT DOCUMENTS

| | | |
|---|---|---|
| 0-589-393-A2 | 3/1994 | (EP) . |
| 0-613-714-A2 | 9/1994 | (EP) . |

* cited by examiner

*Primary Examiner*—Steven P. Griffin
*Assistant Examiner*—Cam N. Nguyen
(74) *Attorney, Agent, or Firm*—Lorraine S. Melotik; William J. Coughlin

(57) ABSTRACT

A method for manufacturing a NOx absorbent useful to purge exhaust gases during lean-burn internal combustion engine operation. The material is resistant to sulfur poisoning hence improving the long term NOx absorption efficiency. The method comprises providing an alumina/ceria support with barium and precious metal of at least platinum and then overcoating with a layer of lithium. The absorbent can be used in the exhaust gas system and subjected to lean operation when the nitrogen oxides are absorbed and then to stoichiometric or rich A/F operation which causes the nitrogen oxide to desorb and then they are reduced over the precious metal.

8 Claims, 1 Drawing Sheet

PROCESS FOR MANUFACTURING NOX TRAPS WITH IMPROVED SULFUR TOLERANCE

FIELD OF THE INVENTION

This invention is related to a method of manufacturing a NOx trap material tolerant to sulfur for use in lean-burn exhaust gas treatment systems. More particularly, the material is made by providing barium and platinum on an alumina-ceria washcoat and overcoating with lithium.

BACKGROUND OF THE INVENTION

Significant research has been undertaken in the area of lean-burn engines, where the A/F ratio is higher than stoichiometry, in order to improve fuel economy. One approach to treating such exhaust gasses involves NOx absorbents, i.e., materials which are able to absorb nitrogen oxides from the exhaust gas during lean-burn operation and then later release them when the oxygen concentration in the exhaust gas is reduced. For example, when the A/F ratio is made rich or stoichiometric. Conventional NOx absorbents are alkaline earth metals like barium with a precious metal catalyst like platinum carried on alumina. The widely held mechanism for this absorption phenomena is that during lean-burn operation the platinum first oxidizes NO to $NO_2$ and the $NO_2$ subsequently forms a nitrate complex with the trapping material, e.g., the barium. In the regeneration mode, under a stoichiometric or rich environment, the nitrate decomposes and the NOx released is reduced catalytically over the platinum with reducing species like HC or CO in the exhaust gas.

Such conventional absorbent materials have a serious deficiency in that the barium reacts with sulfur oxides generally present in exhaust gas to form barium sulfate. This inactivates the barium for NOx absorption. It is suggested that to decompose the barium sulfate it should be subjected to elevated temperatures of at least 600° C. or more in reducing gas conditions. One negative aspect of this regeneration process is that it leads to detrimental changes in the NOx absorbent such as reduced surface area and crystallization of the aluminate phases thereby reducing the efficiency of the NOx absorbent. It is also difficult to carry out on-board a vehicle and the required rich operating conditions results in emission of CO and HC. Alkali metals like potassium have also been suggested as NOx absorbents, however, they are even more easily deactivated by sulfur than alkaline earth metals like barium.

It would be desirable if a NOx absorbent could be found which would be more resistant to sulfur poisoning while being a good NOx absorbent during leanburn engine operation. The present invention overcomes the deficiencies of prior art materials. The material and method of making are disclosed herein.

SUMMARY OF THE INVENTION

The invention is a method of manufacturing a NOx trap material which includes the steps of first providing a support material of alumina/ceria including at least 0.5 wt. % ceria. Then this material is provided with barium and precious metal including at least platinum, preferably from a solution of their soluble salts, to provide at least 1.0 wt. % barium and 0.2 wt. % platinum on the material. Subsequently, the material containing the barium and platinum is overcoated with a layer of 0.5–5 wt. % lithium based on the weight of the barium-precious metal containing support material, i.e., the washcoat. According to another aspect, the invention is the NOx trap material manufactured as disclosed above. In another embodiment, the invention is a method for treating automotive exhaust gas by subjecting the above NOx trap material placed in an exhaust gas passage to lean burn and then stoichiometric or rich exhaust gas.

DETAILED DESCRIPTION OF PREFERRED EMBODIMENTS

Figure 1:
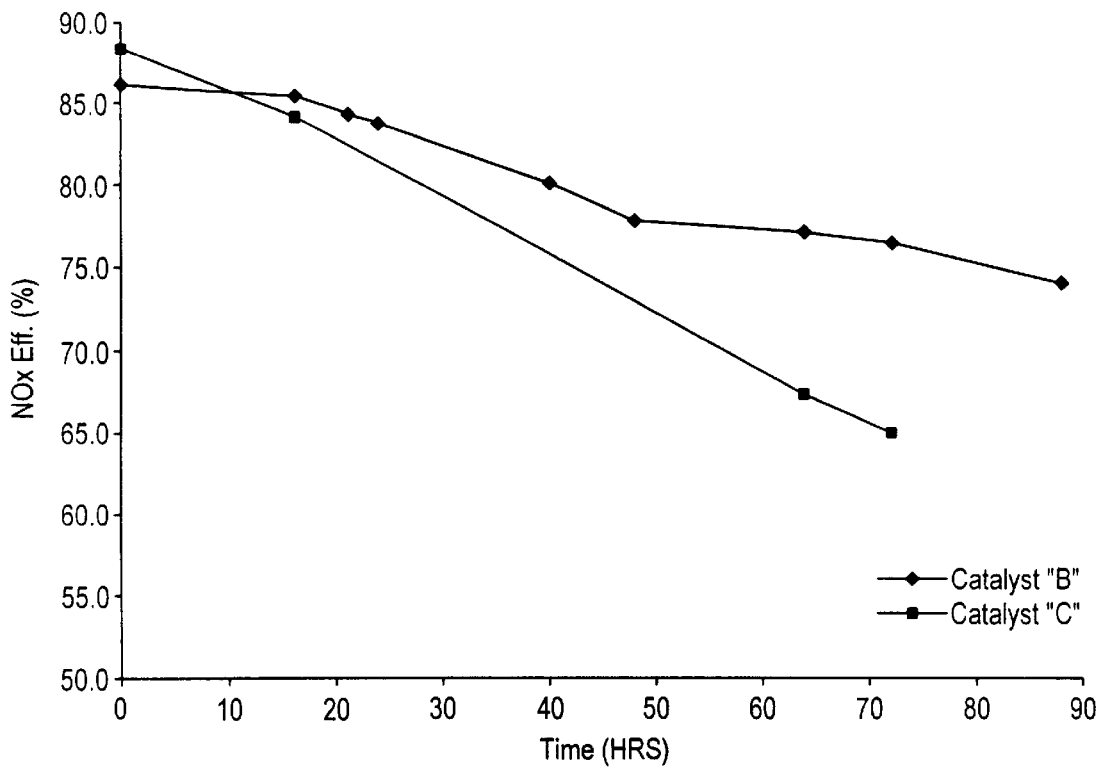
FIG. 1 is a graph which shows the NOx absorption efficiency dependence of lithium on ceria in a catalyst B made according to an embodiment of the present invention.

As disclosed above, the invention is a method for manufacturing a NOx absorbent material which is resistant to sulfur poisoning. In use as a NOx absorbent, the exhaust gas containing carbon monoxide, hydrocarbons, and nitrogen oxides generated by a lean-burn internal combustion engine would be brought in contact with the absorbent. Under lean-burn conditions, where the exhaust gas contains more oxygen than is required for oxidizing components to be oxidized in the exhaust gas, nitrogen oxides are absorbed on the material and when the oxygen concentration in the gas is lowered, as during stoichiometric or rich A/F ratios, the absorbed nitrogen oxides are desorbed and reduced over the precious metal in the material.

We found that manufacturing the NOx absorbent material, both with an overlayer of lithium and also with ceria mixed together with, or impregnated into, the alumina, provides improved sulfur poisoning resistance over conventional NOx trapping materials. In addition, it was unexpectedly found that using the lithium overlayer was not sufficient, but the invention requires the synergy of the ceria in the support material and the lithium overlayer. First it is believed that the invention method manufacture causes intimate contact of the lithium with the barium and platinum. It is further believed that a platinum-lithium interaction is created with suppresses the oxidation of sulfur dioxide over the platinum and hence improves NOx trap sulfur tolerance. Further, a synergism with the ceria and the lithium together was found which is believed to facilitate or catalyze the decomposition of barium sulfate complexes under reducing conditions. That is, without the ceria this synergistic effect is not observed. However, neither the validity nor understanding of the theories discussed above are necessary for the practice of the invention.

The support material is a mixture of alumina and ceria which may be made in a variety of ways. One example involves mixing alumina and ceria together. Preferably the alumina is all or mostly gamma-alumina because of its high surface area and reasonably good thermal stability. The amount of ceria in the support is at least 0.5 wt. % based on the weight of the mixture. Preferably, it is about 2 to 50 wt. % of the mixture. Alternately to make this mixture, either oxide may be impregnated with a solution of a soluble salt of the other metal, e.g., alumina may be impregnated with cerium nitrate. And then the impregnated oxide could be calcined to convert the impregnated metal to its oxide. Other techniques for making the alumina/ceria support material would be apparent to those skilled in the art in view of the present disclosure.

According to the invention method, this support material is then provided with barium and precious metal including at least platinum. One preferred way is by impregnation from aqueous solutions of soluble salts, such techniques being well known in the art. For example, the support material can be contacted with, e.g., hexachloroplatinic acid solution to deposit platinum. To deposit the barium, a solution of a soluble barium salt like barium nitrate can be used. Alternately a mixture of the precious metal and barium in solution can be used for impregnation. It is preferable that the barium precursor be deposited onto the ceria containing alumina support first then dried and calcined before impregnating with the platinum solution. Water soluble compounds are preferred, including, but not limited to nitrate salts. Still other soluble salts and solvents for these salts which could be used in the present invention would be apparent to those skilled in the art in view of the present disclosure. The impregnated product would generally be dried and calcined afterwards.

The barium is included on the alumina/ceria support material in an amount of at least 1 wt. % based on the support. Preferably, it is included in an amount of 5 to 25 wt. %. The precious metal at least includes platinum. The platinum is present in an amount of at least 0.2 wt. % based on the total weight of the alumina-based metal oxide. Preferably, the platinum is employed in an amount of 0.5 to 5.0 wt. % based on the weight of the oxide support, more preferably being included in about 1 to 2 wt. %. In addition to platinum, other precious metals may be included. That is, with the platinum, rhodium in relatively small amounts is desirably also added, optimally as 0.1–5 wt. % rhodium based on the weight of the support. Rhodium is desirably included since it provides a broadening of the NOx conversion window due to increased conversion efficiency of nitrogen oxides at higher temperatures.

Subsequently, the support material with the barium and precious metal is overcoated with a layer of lithium. The amount of lithium is 0.5–5 wt. % based on the weight of the support. This can be conveniently done by impregnation from a solution of a soluble lithium salt, like lithium nitrate. Other suitable methods may also be used, and would be apparent to those skilled in the art in view of the present disclosure.

For useful application as a NOx absorbent material in an exhaust system as disclosed herein, a coating of this material will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the absorbent/catalyst of this invention. It is preferred that the surface area of the monolithic structure provide 50–100 meter square per liter structure. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the support material (without the barium, precious metal, and lithium) may be applied to the substrate and then provided, as by impregnation from solution, with barium, ceria, and precious metal. Subsequently, a coating of lithium would be provided. Alternately, support material, containing the barium, ceria, precious metal and lithium, may be washcoated onto the substrate. Other methods include variations of the above, e.g., the support material including barium and precious metal can be washcoated onto the substrate and subsequently lithium may be provided thereon. Still other ways of providing the invention material for use will be apparent to those skilled in the art in view of the present disclosure, the method not being critical to the present invention. Generally, for use in an exhaust system the impregnated washcoat is subjected to elevated temperatures to decompose and eliminate the functional group of any metal precursors. It may be further subjected to calcining. Optimally, the substrate carries a washcoat of the final absorbent material in an amount of between about 5% and 40% by weight based on the weight of the substrate (e.g., monolith).

If the material is placed in use in an exhaust gas conduit, oxygen present in the exhaust gas will oxidize the precious metal like platinum to platinum oxide which at high temperatures decomposes to platinum and oxygen. Thus it often exists as a mixture of platinum and its oxides.

EXAMPLE 1

This is a comparative example, not according to an embodiment of the present invention since it does not contain lithium as an overlayer. 100 parts of an alumina powder, 30 parts of a cerium nitrate solution containing 10% cerium by weight, and 30 parts of water were mixed, preparing a slurry for coating. A honeycomb support formed of cordierite was immersed into the slurry and excess slurry was blown away. The support was dried at 100° C. for one hour and calcined at 600° C. for 16 hours. The support contained 20 wt. % ceria.

The alumina support was immersed into an aqueous hexachloroplatinic acid and barium acetate solution. The loading amount of barium was 20% by weight and platinum 1% by weight. After drying, the catalyst was calcined at 600° C. for 16 hours Small core (1 inch diameter) samples of the catalyst was loaded in a quartz flow reactor and evaluated for NOx absorption efficiency with time. Temperature during evaluation was 600° C. The flow rate is 3.2 L/min. The feedgas consisted of 10% $H_2O$, 10% $CO_2$, 1%, 1500 ppm HC, 500 ppm NOx, S 2 ppm, 0–6% $O_2$.

The NOx absorption efficiency of this comparative example catalyst is shown in FIG. 1 as plot "A".

EXAMPLE 2

This catalyst was prepared according to an embodiment of the present invention. An alumina/ceria support as in Example 1 was prepared which contained 20 wt. % ceria. This alumina support was immersed into an aqueous hexachloroplatinic acid and barium acetate solution also as in Example 1. After drying, the catalyst was calcined at 600° C. for 16 hours. The loading amount of barium is 20% by weight and platinum was 1% by weight as in Example 1.

Figure 2:
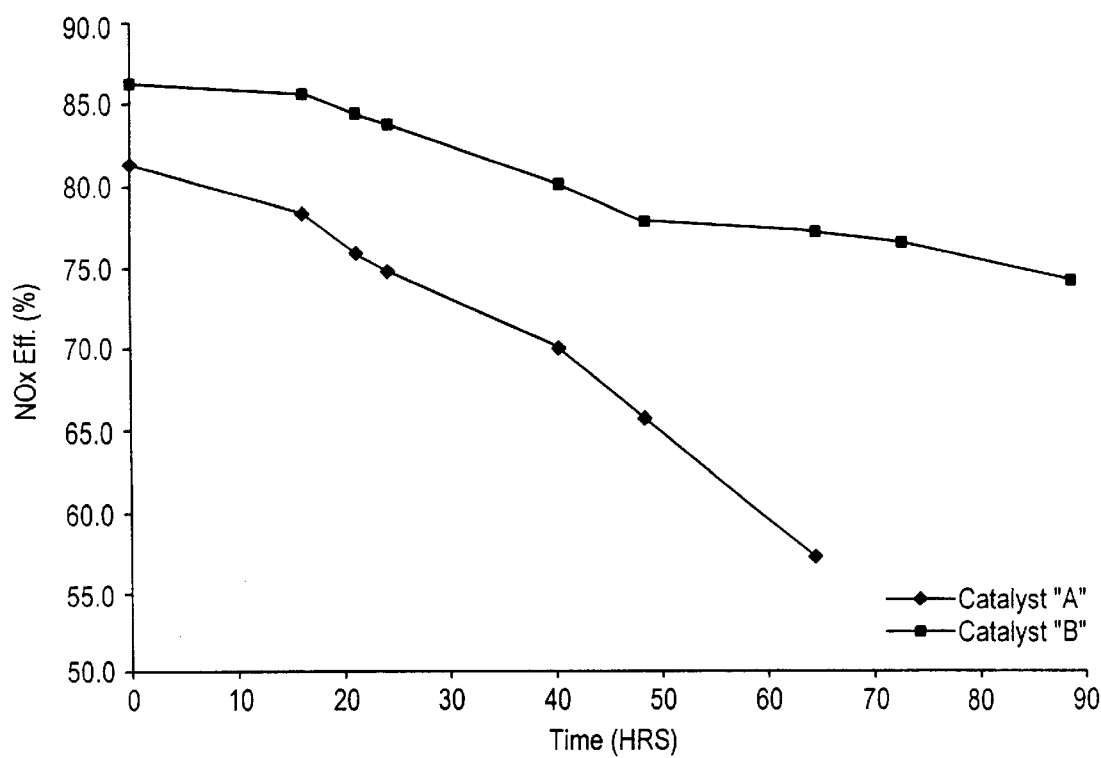
FIG. 2 is a graph which shows NOx absorption efficiency dependence of ceria on lithium in a catalyst B made according to an embodiment of a present invention.

The catalyst support was immersed into an aqueous lithium nitrate solution. The calcined catalyst was loaded with 3% lithium by wt. The catalyst is dried and calcined for 16 hours at 600° C. The NOx absorption efficiency of this invention catalyst "B" was tested according to the procedure described in Example 1 and is shown in FIGS. 1 and 2.

EXAMPLE 3

This is an example of an embodiment of the present invention catalyst. 100 parts by wt of aluminum powder and 100 parts by wt. Of cerium dioxide powder were mixed with water and ball-milled to produce a slurry. A honeycomb support formed of cordierite was immersed into the slurry and excess slurry was blown away. The support was dried at 100° C. for 1 hour and calcined at 600° C. for 16 hours.

The alumina support was immersed into an aqueous hexachloroplatinic acid and barium acetate solution as in the above examples, and after drying, the catalyst was calcined at 600° C. for 16 hours. The loading amount of barium was 20% by weight and platinum was 1% by weight on the washcoated substrate.

The washcoated substrate was placed in a solution of lithium nitrate allowing for gradual uptake resulting in a 3% deposition of $Li_2O$ and dried at 80° C./6 hr and then calcined at 600° C./16 hr.

EXAMPLE 4

This is a comparative example, not according to the present invention since it does not include ceria in the catalyst support. 100 parts of an alumina powder and 30 parts of water were mixed, preparing a slurry for coating. A honeycomb support formed of cordierite was immersed into the slurry and excess slurry was blown away. The support was dried at 100° C. for one hour and calcined at 600° C. for 16 hours.

The alumina support was immersed into an aqueous hexachloroplatinic acid and barium acetate solution as in the first two examples. After drying, the catalyst was calcined at 600° C. for 16 hours. The loading amount of barium in the support was 20% by weight and platinum is 1% by weight.

The catalyst support was immersed into an aqueous lithium nitrate solution to coat the support with lithium as in Example 2. The lithium coated catalyst, loaded with 3% by weight lithium, was calcined for 16 hours at 600° C. This comparative catalyst "C" was tested for NOx absorption efficiency as samples "A" and "B" and the results were plotted in FIG. 2.

The figures show that present invention catalyst embodiment B with ceria in the washcoat together with an overlayer of lithium has significantly improved resistance to sulfur poisoning. This resistance to sulfur poisoning results in less deterioration in NOx absorption as compared to similar sample catalysts either without ceria in the washcoat (catalyst A—FIG. 1) or without an overlayer of lithium (catalyst C—FIG. 2). For example, in FIG. 2, the Li-coated sample without Ce in the washcoat (Catalyst C) showed more deterioration in $NO_x$ absorption efficiency with time due to $SO_x$ poisoning as compared to invention catalyst B.

The combination of the ceria and lithium is believed to be synergistic in effect to provide excellent sulfur poisoning resistance and hence decrease the deterioration of the NOx absorption ability of the catalyst with time.

We claim:

1. A method for treating exhaust gases from an internal combustion engine using a nitrogen oxide absorbent, said method comprising the steps of:

exposing a nitrogen oxide absorbent material located in the exhaust gas passage of an internal combustion engine to engine exhaust gases having a lean of stoichiometric air/fuel ratio whereby said absorbent absorbs nitrogen oxides from said exhaust gas, said absorbent made by a method which comprises the steps of:

providing a support material of alumina/ceria including at least 0.5 wt. % ceria;

providing the material with barium and precious metal including at least platinum so as to provide at least 1.0 wt. % barium and 0.2 wt. % platinum on the material; and overcoating the material containing barium and precious metal with a layer of 0.5–5 wt. % lithium based on the total weight of the material;

purging said absorbed nitrogen oxides from said absorbent by subjecting said absorbent to engine exhaust gases whose air/fuel ratio is stoichiometric or rich of stoichiometry.

2. The method according to claim 1 wherein the amount of ceria in the alumina/ceria material is 0.5 to 50 wt. %.

3. The method according to claim 1 wherein the amount of barium in the material is at least 1.0 wt. %.

4. The method according to claim 1 wherein the amount of platinum in the material is at least 5 wt. %.

5. The method according to claim 1 wherein the barium and precious metal are impregnated on the material from a solution containing a mixture of their soluble salts.

6. The method according to claim 1 wherein the barium and precious metal are impregnated on the material from separate solutions thereof.

7. The method according to claim 1 wherein the layer of lithium is provided by contacting the material with a solution of lithium nitrate.

8. The method according to claim 1 wherein the precious metal further includes rhodium in an amount of 0.1 to 5 wt. % based on the weight of the support material.

* * * * *